3,510,433
Patented May 5, 1970

---

3,510,433
WATER TREATING COMPOSITION AND METHOD
Anthony F. Pasowicz, Mount Prospect, Ill., assignor to Wright Chemical Corporation, Chicago, Ill., a corporation of Illinois
No Drawing. Continuation-in-part of application Ser. No. 409,995, Nov. 9, 1964. This application June 5, 1967, Ser. No. 643,364
Int. Cl. C02b 1/02, 5/10
U.S. Cl. 252—180     13 Claims

ABSTRACT OF THE DISCLOSURE

A water treating composition particularly adapted for biocidal treatment in industrial water systems wherein only minimal quantities of foam can be tolerated which is composed of a biocide constituent, a defoamer constituent normally immiscible therewith, and a modified cellulose polymer which is present in a quantity sufficient to enable the normally immiscible biocide and defoamer constituents to form an emulsion which remains stable for extended periods of time. The biocide constituent generally includes at least one or more quaternary ammonium compounds and/or organic amines which while exhibiting effective biocidal properties in such industrial water systems tend to produce foam therein. The defoamer constituent generally includes a polysiloxane defoamer and, in a preferred embodiment of the present invention, includes both a polysiloxane defoamer and a second defoamer selected from the group consisting of tris (2-ethylhexyl) phosphate and tridecyl alcohol. The modified cellulose polymer is characterized by viscosity producing characteristics such that, when present in an aqueous solution in a concentration of 2% by weight, it produces a viscosity for such solution of at least 25 cps. Preferably, the modified cellulose polymer includes at least one cellulose ether selected from the group consisting of methyl ether cellulose, propylene glycol ether cellulose, hydroxyethyl ether cellulose, hydroxypropyl ether cellulose, and methyl ether propylene glycol ether cellulose. If desired, the modified cellulose polymer can be supplemented with suitable emulsion stabilizers which function to gell and/or thicken the emulsion, such as, for example, the modified galactomannan gums and mineral clays.

The biocide constituent, defoamer constituent and modified cellulose polymer are usually combined with a diluent such as water or a suitable alcohol for providing single stream administration of the composition in an industrial water system to be treated. The relative concentrations of the biocide constituent to the defoamer constituent generally range from approximately one part defoamer for each half part biocide to one part defoamer for each 50 parts of biocide. In the preferred embodiment of the present invention wherein the defoamer constituent consists essentially of the polysiloxane defoamer and a second defoamer selected from the group consisting of tris (2-ethylhexyl) phosphate and tridecyl alcohol, the ratio of the weight concentrations of polysiloxane defoamer to the second defoamer ranges from approximately one part polysiloxane defoamer for each two parts of the second defoamer to one part polysiloxane defoamer for each 200 parts of the second defoamer. Preferably, however, in such compositions the defoamer constituent is composed of approximately one part polysiloxane defoamer for each 20 parts of tris (2-ethylhexyl) phosphate and/or tridecyl alcohol.

BACKGROUND AND DESCRIPTION OF INVENTION

This application is a continuation-in-part of my copending application entitled "Water Treating Reagent and Method," Ser. No. 409,995, filed Nov. 9, 1964, now abandoned.

The present invention generally relates to an improved water treating reagent and method which are particularly adapted to provide effective biocidal treatment in industrial water systems wherein only minimal quantities of foam can be tolerated, such as, for example, in industrial air washer systems, cooling tower installations, spray ponds, pasteurizers, air conditioners, and the like. More particularly, this invention is concerned with a water treating composition which includes an effective biocide such as a quaternary ammonium compound and/or organic amine together with a polysiloxane or equivalent defoamer which are combined with a modified cellulose polymer and a diluent such as water or an alcohol in a uniformly dispersed highly stable emulsion. In a preferred and important embodiment of the present invention, the polysiloxane defoamer is combined with a second defoamer selected from the group consisting of tris (2-ethylhexyl) phosphate and tridecyl alcohol.

The quaternary ammonium compounds and organic amines are known to be effective in a number of water treatment capacities. For example, these compounds have been used as biocides, germicides, corrosion inhibitors, emulsifying agents, and the like. Due to their chemical nature, however, these compounds produce foam in quantities which can present serious operational and quality control problems. Typical of instances where the quantity of foam produced is critical are cooling tower installations, air-washer systems, air conditioners, spray ponds and pasteurizers.

While undesirable foam production can be controlled with mechanical defoaming equipment, it has generally been found that chemical defoamers are more effective and economical. Unfortunately, the natural immiscibility of these biocides and many chemical defoamers, has necessitated that the foam control material be separately added to the system. Heretofore, in order to insure that the desired ratio of defoamer to biocide is maintained in the water treating system, it has been necessary that the foam control material be added at a carefully controlled rate or, periodically as needed. This, of course, requires that careful attention be given to the administration of these water treating reagents and has been objected to, particularly where the water is treated in an otherwise automated operation. Also, the use of such conventional water treating biocides and defoamers has necessitated the storing and handling of a plurality of reagents where desirably a single composition could be used in their place.

In accordance with the present invention these foam producing biocides are cooperatively combined with a polysiloxane or equivalent defoamer and a modified cellulose polymer characterized by viscosity producing properties such that when present in a 2% concentration in a water solution it will produce a viscosity for such solution of at least 25 cps. at room temperature. This composition can then be discharged on a single-stream basis in air-washer systems and the like without incurring the production of foam therein in undesirable quantities.

An important aspect of the present invention involves the incorporation of a polysiloxane defoamer and second defoamer selected from the group consisting of tris (2-ethylhexyl) phosphate and tridecyl alcohol in these novel water treating compositions to provide such compositions with a substantially reduced tendency to foam and prolonged foam control properties. In this regard, it was unexpectedly noted that the improved defoaming properties obtained with defoamer combination were far better than were obtainable with either of the individual components thereof when used separately.

The preferred embodiment of the present invention is particularly suited to the biocidal treatment of water in industrial air-washer systems such as commonly employed in tobacco plants and textile mills since the presence of foam therein, even in minute quantities, is objectionable. In particular, it has been found that when such systems are heavily infested with foam, the use of a polysiloxane alone is not adequate to eliminate the excessive buildup of slime and bacterial growth which produce objectional odors, clogging of nozzles and an overall unsightly appearance. Accordingly, in such heavily infested systems it heretofore has been necessary to shut down these units so that they could be manually cleaned. Since these units are relatively large in size, these shut downs commonly took extended periods of time and were therefore costly. In using the water treating compositions of the preferred embodiment of the present invention, however, it was found that effective biocidal control was provided with improved defoaming to an extent that such shut down and manual cleaning could be eliminated. Moreover, it was noted that the defoaming obtained was improved to an extent that once the unit was cleaned, the addition of this composition to the system once or twice a week was sufficient to maintain the same in efficient operation.

It is, therefore, an object of the present invention to provide an improved water treating method and reagent which are free from the above-mentioned problems and disadvantages.

Another object of the present invention is to provide a water treating composition which includes a biocide selected from the group consisting of quaternary ammonium compounds and organic amines which composition is characterized by substantially reduced foam production.

Another object of the present invention is to provide a water treating composition which includes a biocide having a tendency to produce foam and chemical defoamer normally immiscible therewith, which biocide and defoamer are combined in a completely dispersed and stabilized emulsion wherein the foam producing tendencies of the biocide are controlled without reducing its effectiveness as a water treating reagent.

Another object of the present invention is to provide a water treating composition including two immiscible ingredients one of which is characterized by a tendency for high foam production and the other by an ability to control this tendency, wherein said ingredients are held in uniform distribution throughout the composition by means of a viscous stabilizer.

Another object of the present invention is to provide a water treating composition having as a principal ingredient thereof a quaternary ammonium compound which can be supplied to a system to be treated on a single stream basis without the production of excessive amounts of foam.

Another and important object of the present invention is to provide an improved water treating composition which incorporates a biocide exhibiting a tendency to foam and a chemical defoamer constituent, normally immiscible with said biocide, which chemical defoamer constituent provides substantially extended and improved defoaming.

Another object of the present invention is to provide an improved water treating composition which incorporates a defoamer constituent consisting essentially of a polysiloxane defoamer and a second defoamer selected from the group consisting of tris (2-ethylhexyl) phosphate and tridecyl alcohol each of which, when combined, exhibits substantially improved defoaming characteristics superior to those exhibited by each of these defoamers when used individually.

Another object of the present invention is to provide a method of controlling the growth of bacteria and fungi in industrial water systems wherein only minimal amounts of foam can be tolerated which method involves the periodic addition of an improved emulsion type water treating composition on a single stream basis which emulsion type water treating composition is characterized by substantially improved defoaming properties.

Other and further objects of the present invention will be apparent from the following detailed description of the present invention.

The water treating composition of the present invention generally includes a biocide constituent which while being characterized by effective biocidal properties exhibits a tendency to produce foam. These biocides are well known to those skilled in this art and typically include the quaternary ammonium compounds and organic amines. These quaternary compounds may be represented by the following general formula

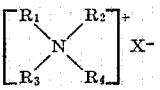

wherein $R_1$, $R_2$, $R_3$ and $R_4$ represent organic groups and X represents a halogen, hydroxyl, phosphate, sulfate, acetate or nitrate radical. A typical example of a specific class of quaternary ammonium compounds having biocidal properties which make them desirable for use in water treatment are the alkyl dimethyl benzyl ammonium chlorides represented by the general formula

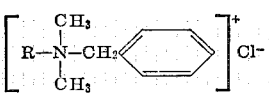

wherein R represents an alkyl group having from 1 to 18 carbon atoms. Examples of other quaternary ammonium compounds which may be used in the biocide constituent of the present invention are the quaternary ammonium salts of the cyclic amines (i.e. pyridine, picoline, lutidine), a specific example being cetyl pyridinium chloride.

It is important to note that the quaternary ammonium compounds encompassed by the present invention are not limited in scope by the above-mentioned specific examples but include all such compounds which, while exhibiting effective biocidal properties in industrial water systems are characterized by a tendency to produce foam therein. Also, any of these compounds can be used alone or in combination.

In addition to the quaternary ammonium compounds which may be employed in the biocidal constituent of the present invention, numerous organic amines are also suitable therein for use either alone or in combination with these quaternary ammonium compounds. Such organic amines exhibit effective biocidal properties but are also characterized by a tendency to produce foam in the industrial water systems. Examples of such amines will be apparent to those skilled in this art, however, for illustrative purposes it can be noted that they generally include amine type biocides such as N-coco-1,3 propylene diamine, N-alkyl trimethylene diamine, wherein the alkyl group is derived from a fatty acid, aliphatic primary amines such as dodecyl amine, tetradecyl amine, hexyldecyl amine and octadecyl amine. In addition, other amines which can be so used are the beta primary amines and the beta diamines.

The biocide constituent of the present invention can also include other materials which exhibit biocidal properties but which may not in and of themselves exhibit a tendency to produce foam. Typically, in this category of compounds are the various tin compounds such as bis (tri-n-butyl tin) oxide, tributyl tin neodecanoate, tributyl tin di(hydroxymethyl) phosphinate, tributyl tin benzoate, bis (tri-n-butyl tin) sulfide, tributyl tin hydroxide, tributyl tin acetate and triethyl tin hydroxide. Other biocides exhibiting properties and characteristics similar to these biocides will, of course, be apparent to those skilled in this art and accordingly are within the scope of the present invention.

Since the water solubility of the amines which can be used in the biocide constituent of the present invention is relatively low, it is preferred that a suitable acid be combined therewith in order to make such amines water soluble. Typically, acetic acid can be used for this purpose and, when added to the formulation, causes the amine to undergo a typical neutralization reaction resulting in the formation of an amine acetate. Other suitable acids for solubilizing these amines will be apparent to those skilled in this art and include, for example, hydrochloric acid and adipic acid.

The chemical defoamers which can be employed in the water treating compositions of the present invention are generally characterized by a natural immiscibility with the biocide constituent. Also, these chemical defoamers do not interfere with the biocidal properties of the quaternary ammonium compounds and organic amines in the biocide constituent. Suitable chemical defoamers include the silicones or polysiloxanes such as, for example, methyl polysiloxane, dimethyl polysiloxane, methyl phenyl polysiloxane and other silicone defoamers which exhibit properties and characteristics similar thereto. Examples of other polysiloxane defoamers which can be incorporated in the defoamer constituent of the present invention are described in U.S. Pat. 2,646,231, "Organic Cyclic Silicone Condensation Polymers" and British Pat. 614,626, "Inhibiting Formation of Froth." If desired, these polysiloxane defoamers can be used in conjunction with other chemical defoamers such as, for example, tri (butoxyethyl) phosphate, tricresyl phosphate, polypropylene glycol, polyethylene glycol, kerosene, tri-n-butyl phosphate, octyl alcohol, trimethyl nonanol, heptanol and diisobutyl carbinol.

In a preferred embodiment, the water treating compositions of the present invention include a defoamer constituent which is essentially composed of a polysiloxane defoamer and a second defoamer selected from the group consisting of tris (2-ethylhexyl) phosphate and tridecyl alcohol. In this regard, it should be noted that an important aspect of the present invention involves the discovery that the polysiloxane defoamers can be cooperatively combined with tris (2-ethylhexyl) phosphate and/or tridecyl alcohol to achieve a unique and conjoint defoaming action which is unexpected in that such combination will completely defoam a sample of water being treated with a quaternary ammonium compound in less time than when the polysiloxane, tris (2-ethylhexyl) phosphate or tridecyl alcohol are used separately (see Example 23). The combined use of a polysiloxane and tris (2-ethylhexyl) phosphate produces a synergistic defoaming action which does not occur when the same polysiloxane defoamers are used with other organic phosphates. For example, in tests conducted with tri(butoxyethyl) phosphate and tributyl phosphate, the time required for defoaming is actually longer than where the polysiloxane defoamer is used alone (see Example 24). Similarly, in tests conducted with the compositions of the present invention which include a polysiloxane defoamer and tridecyl alcohol, a comparable synergistic defoaming action is observed (see Example 24).

In accordance with the present invention, these normally immiscible biocide and defoaming constituents are effectively combined in a uniformly dispersed highly stable emulsion which remains unseparated for extended periods of time by the use of a modified cellulose polymer characterized by viscosity producing properties such that when these modified cellulose polymers are present in water in a concentration of 2% by weight they produce a viscosity for such water solution of at least 25 cps. at room temperature. Typically, these modified cellulose polymers can have molecular weights ranging from approximately 10,000 to over 125,000. In particular, it has been found that the cellulose ethers such as, for example, methyl ether cellulose, propylene glycol ether cellulose, hydroxyethyl ether cellulose, hydroxypropyl ether cellulose and methyl ether propylene glycol ether cellulose can be advantageously used in the water treating compositions of the present invention. Preferred modified cellulose polymers include a methyl ether propylene glycol ether cellulose which when present in an aqueous solution in a concentration of 2% by weight produces a viscosity for such solution of approximately 4000 cps. at room temperature and a hydroxy ethyl ether cellulose characterized by viscosity producing properties such that when present in a 2% concentration in a water solution it produces a viscosity for such solution of approximately 25,000 cps. at room temperature.

While the precise mechanism by which these modified cellulose materials function with the biocide and defoamer constituents of the present invention is not understood, it is believed that the inherent properties of these cellulose materials to act as surfactants, dispersants, emulsifiers, thickeners and stabilizers are responsible for the unique result obtained. In part, it is believed that the wetting and dispersing action of the cellulose materials tends to facilitate more uniform distribution of the polysiloxanes and other defoamers in the biocide mixture. At the same time, the emulsifying effect of these celluose materials, which results from one part of the molecule being water-soluble and the other part being oil-soluble, operates to reduce the interfacial tension between the oil and water phases to produce a uniform distribution of minute droplets of defoaming material. These properties, in combination with the thickening property of the celluose materials, serves to stabilize against separation of phases which might otherwise result from rapid or extreme temperature changes, vibration, passage of time and the like.

If desired, these modified cellulose polymers can be supplemented with suitable emulsion stabilizers which function to gell and/or thicken the emulsion for providing said emulsions with extended stability. In this regard, it has been found that when modified natural gums and mineral clays are employed in combination with the modified cellulose polymers of the present invention that the amount of modified cellulose polymer required in the water treating compositions of the present invention can be reduced. Suitable modified natural gums which can be used in combination with the modified cellulose polymers in these water treating compositions include the galactomannan gums which have been chemically modified to carry cationic functionality. A suitable commercially available product of this type is identified as Gendriv 158 (General Mills, Minneapolis, Minn.). Other suitable natural gums are those chemically derived natural gums wherein the basic polysaccaride molecule has been modified to provide such materials with compatability with a wide range of both organic and inorganic materials in aqueous systems. A suitable commercially available product of this type is Gendriv 492 (General Mills, Minneapolis, Minn.). Typical mineral clays which can be suitably combined with the modified cellulose polymers of the present invention are the attapulgites such as

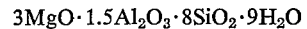

$$3MgO \cdot 1.5Al_2O_3 \cdot 8SiO_2 \cdot 9H_2O$$

and the hectorites such as, for example, a lithium-magnesium hydroxy fluosilicate with an exchangeable sodium cation and the chemically modified hectorite clays wherein the exchangeable sodium cation has been replaced by an organic cation.

Suitable diluents which can be combined with the biocide and defoamer constituents and modified cellulose polymers in formulating these water treating compositions include water and alcohols such as methanol, ethanol, 1-propanol (n-propyl alcohol), 2-propanol (isopropyl alcohol), n-butyl alcohol, sec-butyl alcohol, iso-butyl alcohol, and 2-methyl propanol. Equivalent alcohols which can be substituted in place of these alcohols or used in conjunction therewith will be obvious to those skilled in this art.

In accordance with the present invention, these water treating compositions generally have a biocide to defoamer constituent weight component ratio which ranges from approximately one part defoamer for each half part of biocide to one part of defoamer for each 50 parts of biocide. Preferably, in those compositions which have defoamer constituents consisting essentially of a polysiloxane defoamer, it has been found that approximately one part of polysiloxane defoamer for each 5 to 7 parts of biocide will eliminate about 90% to 95% of the foam produced by the quaternary ammonium compounds and organic amines in the biocide. In the preferred embodiment of the present invention wherein the defoamer constituent consists essentially of a polysiloxane defoamer and a second defoamer selected from the group consisting of tris (2-ethylhexyl) phosphate and tridecyl alcohol, it has been found that approximately one part by weight of the combined defoamer for each two parts of biocide will eliminate essentially all of the foam produced by such biocide in a matter of seconds.

The composition of the defoamer constituent in the preferred embodiment of the present invention can be varied in accordance with the requirements of the system being treated. In this regard, it has been found that a suitable weight component ratio of polysiloxane to tris (2-ethylhexyl) phosphate and/or tridecyl alcohol in a given water treating composition embodying the present invention will generally range from approximately one part of polysiloxane for each two parts of tris (2-ethylhexyl) phosphate and/or tridecyl alcohol to one part of polysiloxane for each 200 parts of tris (2-ethylhexyl) phosphate and/or tridecyl alcohol. In particular, however, a weight component ratio of approximately one part of polysiloxane defoamer for each 20 parts of tris (2-ethylhexyl) phosphate and/or tridecyl alcohol is preferred.

The concentration of modified cellulose polymer present in the water treating compositions of the present invention will vary in accordance with the viscosity of the particular modified cellulose polymer employed in a given formulation. For this reason, the concentration range of modified cellulose polymer in the water treating compositions of the present invention can be best described as those amounts which enable the normally immiscible biocide and defoamer constituents to remain in a uniformly dispersed stable emulsion for extended periods of time (i.e. in the order of two, three or more months). In finished compositions (those containing the biocide, defoamer, modified cellulose polymer and water or alcohol) it has been found that weight concentrations of modified cellulose polymer of from 0.50% to 25%, based on the total weight of the composition, were suitable for effecting the desired degree of stability in these compositions. In such compositions the total biocide constituent weight concentration generally ranged from approximately 1.0% to 75% and the defoamer constituent concentration ranged from 0.50% to 40%.

Upon feeding these compositions into industrial water systems it was found that they produced corresponding concentrations in the water being treated of from 0.006 to 500 p.p.m. of modified cellulose polymer, of from 0.1 to 200 p.p.m. of biocide, and of from 0.1 to 400 p.p.m. of defoamer.

The sequence of combining the respective ingredients in these water treating compositions was not critical in that satisfactory compositions were prepared using different sequences. It was noted, however, that mixing of the constituents was facilitated by first combining all ingredients in the biocide constituent and then adding the modified cellulose polymer thereto with thorough mixing. This was then followed by addition of the defoamer ingredients with mixing and the addition of water or a suitable alcohol to bring the composition up to the desired concentration and viscosity.

The following examples are set forth for illustrative purposes and are not to be construed as limitations on the scope of the present invention.

EXAMPLE 1

A water treating composition embodying the present invention was prepared by mixing 24 grams of a commercial aqueous quaternary ammonium compound mixture (containing 25% by weight dodecyl dimethyl benzyl ammonium chloride, 15% by weight tetradecyl dimethyl ammonium chloride, 8.5% by weight hexadecyl dimethyl ammonium chloride, 1.5% by weight octadecyl dimethyl benzyl ammonium chloride and 50% by weight of water) with 2.5 g. of tributyl tin oxide and 2 g. of a methyl ether propylene glycol ether cellulose having viscosity producing characteristics such that when this material is present in an aqueous solution in a concentration of 2% by weight it produces a viscosity for such solution of 4000 cps. at room temperature. Three grams of a polysiloxane emulsion (30% active) and 68.5 g. of water were then added and thoroughly mixed therewith to produce a uniformly dispersed product having an over-all viscosity of approximately 7500 cps. at room temperature. After over eight months this composition was observed to still be in a stabilized condition (without the biocide and defoamer constituents separating out into individual phases).

EXAMPLE 2

Seventy-five grams of lauryl pyridinium chloride were thoroughly mixed with 1.0 grams of a hydroxy propyl cellulose ether having viscosity producing characteristics such that when this material is present in an aqueous solution in a concentration of 1% by weight it produces a viscosity for such solution of from 1500 to 2500 cps. at room temperature. To this mixture 14.1 grams of dimethyl polysiloxane and 9.0 g. of methanol plus 1.8 g. of water were added. This composition had the over-all consistency of a stiff paste and was observed to remain in a stable condition for a period of over three months.

EXAMPLE 3

Fourteen grams of the aqueous quaternary ammonium compound mixture of Example 1 were thoroughly mixed with 2.0 g. of the modified cellulose polymer of Example 1 and 4.0 g. of a 30% active polysiloxane emulsion. The resultant mixture was then combined with 80 g. of water and thoroughly mixed. This product had a viscosity of approximately 6000 cps. and was observed to be in a stabilized (unseparated) condition after a period of over four and a half months.

EXAMPLE 4

Fourteen grams of the aqueous quaternary ammonium compound mixture of Example 1 were mixed with 3.0 g. of a methyl ether propylene glycol ether cellulose polymer having viscosity producing characteristics such that when this material is present in an aqueous solution in a concentration of 2% by weight it produces a viscosity for such solution of 4000 cps. at room temperature. These ingredients were then thoroughly combined with 1.2 g. of a polysiloxane defoamer and 81.8 g. of water. This composition had a viscosity of 14,000 cps. at room temperature and remained in an unseparated condition for a period of over four months.

EXAMPLE 5

Fourteen grams of the aqueous quaternary ammonium compound mixture of Example 1 were thoroughly mixed with 4.0 g. of a methyl ether propylene glycol ether cellulose polymer having viscosity producing characteristics such that when this material is present in an aqueous solution in a concentration of 2% by weight it produces a viscosity for such solution of 15,000 cps. at room temperature and 1.2 g. of a polysiloxane defoamer. These ingredients were then combined with 80.8 g. of water and thoroughly mixed. The composition had the overall consistency of a stiff gel and was observed to remain in a stable condition for a period of over three and a half months.

EXAMPLE 6

Fourteen grams of the aqueous quaternary ammonium compound mixture of Example 1 were thoroughly mixed with 5.0 g. of a methyl ether propylene glycol ether cellulose polymer having viscosity producing characteristics such that when this material is present in an aqueous solution in a concentration of 2% by weight it produces a viscosity for such solution of 100 cps. at room temperature. These ingredients were then thoroughly mixed with 1.2 g. of a polysiloxane defoamer and 79.8 g. of water. This composition had a viscosity of approximately 4500 cps. at room temperature and was observed to remain in a stable (unseparated) condition for a period of over three and a half months.

EXAMPLE 7

Forty grams of a 50% aqueous quaternary ammonium compound mixture containing 10 g. of tallow trimethylammonium chloride and 10 g. of dimethyldicocoammonium chloride were mixed with 6.0 g. of the modified cellulose polymer of Example 5. To these ingredients 3 g. of dimethyl polysiloxane and 51 g. of water were added and thoroughly mixed therewith. This composition had the consistency of a stiff paste and was observed to be in a stable (unseparated) condition at the end of three months.

EXAMPLE 8

Fourteen grams of the aqueous quaternary ammonium compound mixture of Example 1 were thoroughly mixed with 6.0 g. of a methyl ether cellulose polymer characterized by viscosity producing characteristics such that when this material is present in an aqueous solution in a concentration of 2% by weight it produces a viscosity for such solution of 4000 cps. at room temperature. 1.2 g. of a polysiloxane defoamer were added to this mixture and 78.8 g. of water were subsequently added thereto. The finished composition had the over-all consistency of a stiff gel and was observed at the end of a period of three and a half months to be in an unseparated condition.

EXAMPLE 9

Fourteen grams of the aqueous quaternary ammonium compound mixture of Example 1 were thoroughly mixed with 7.5 g. of a methyl ether cellulose polymer characterized by viscosity producing characteristics such that when this material is present in an aqueous solution in a concentration of 2% by weight it produces a viscosity for such solution of 25 cps. at room temperature. This mixture was then combined with 1.2 g. of polysiloxane defoamer and 77.3 g. of water. Upon thoroughly mixing all of these constituents, it was found that the composition had a viscosity of approximately 11,000 cps. at room temperature and was observed to be in a stabilized (unseparated) condition after a period of three and a half months.

EXAMPLE 10

One gram of lauryl pyridinium chloride was thoroughly mixed with 10 g. of a methyl ether propylene glycol ether cellulose polymer characterized by viscosity producing characteristics such that when this material is present in an aqueous solution in a concentration of 2% by weight it produces a viscosity for such solution of 50 cps. at room temperature. This mixture was then combined with 4 g. of dimethyl polysiloxane and 85 g. of water. After being thoroughly mixed, it was observed that the composition had an over-all paste-like consistency and remained in an unseparated condition for a period of over two months.

EXAMPLE 11

Fourteen grams of an aqueous quaternary ammonium compound mixture were thoroughly mixed with 10 g. of the modified cellulose polymer of Example 9 and 1.2 g. of a polysiloxane defoamer. 74.8 g. of water were then added to these ingredients and the resultant composition thoroughly mixed. It was observed that this composition had the consistency of a stiff paste and remained in a stabilized (unseparated) condition for a period of over three months.

EXAMPLE 12

Sixty grams of lauryl pyridinium chloride were thoroughly mixed with 0.5 g. of a methyl ether propylene glycol ether cellulose polymer having viscosity producing characteristics such that when this material is present in an aqueous solution in a concentration of 2% by weight it produces a viscosity for such solution of 4000 cps. at room temperature. 1.2 g. of a polysiloxane defoamer, 28.3 g. of water and 10.0 g. of isopropanol were then added thereto. After being thoroughly mixed, the resultant composition had an over-all paste-like consistency and was observed to be in a stabilized (unseparated) condition after a period of over three and a half months.

EXAMPLE 13

Ten grams of lauryl pyridinium chloride and 30 g. of the aqueous quaternary ammonium compound mixture of Example 1 were thoroughly mixed with 1.0 g. of the modified cellulose polymer of Example 2, 1.0 g. of the modified cellulose polymer of Example 9 and 1.0 g. of a hydroxy ethyl ether cellulose polymer having viscosity producing characteristics such that when this material is present in an aqueous solution in a concentration of 2% by weight it produces a viscosity of 25,000 cps. for such solution at room temperature. To these ingredients, 1 g. of dimethyl polysiloxane and 1 g. of a fluorine substituted polysiloxane were added together with 55 g. of water. The resultant composition was thoroughly mixed and was observed to have the over-all consistency of a stiff gel. It was observed at the end of a period of approximately two and a half months that this composition had remained in a stabilized (unseparated) condition.

EXAMPLE 14

Seventy-five grams of lauryl pyridinium chloride were combined with 0.1 g. of the modified cellulose polymer of Example 2 and 14.1 g. of a 30% active polysiloxane emulsion. This mixture was then diluted with 9.0 g. of methanol and 1.8 g. of water. The resultant composition upon being thoroughly mixed had the over-all consistency of a stiff paste and remained in a stabilized (unseparated) condition for a period of over three months.

EXAMPLE 15

Ninety grams of the aqueous quaternary ammonium compound mixture of Example 1 were mixed with 0.1 g. of the modified cellulose polymer of Example 5 and 1.0 g. of dimethyl polysiloxane. 7.0 g. of isopropanol and 1.9 g. of water were then added thereto with mixing. The resultant composition had a viscosity of approximately 35,000 cps. at room temperature and after a period of three and a half months was observed to still be in a stable (unseparated) condition.

EXAMPLE 16

Fourteen grams of the aqueous quaternary ammonium compound mixture of Example 1 were combined with 2.0 g. of a hydroxy ethyl ether cellulose polymer having viscosity producing characteristics such that when this material is present in an aqueous solution in a concentration of 2% by weight it produces a viscosity for such solution of 25,000 cps. at room temperature. 1.2 g. of a polysiloxane defoamer were then added to the mixture together with 82.8 g. of water. This composition was then thoroughly mixed to produce a water treating composition having an over-all viscosity of approximately 5000 cps. at room temperature. After a period of over five months, it was observed that this composition still remained in a stable (unseparated) condition.

EXAMPLE 17

4.8 g. of the aqueous quaternary ammonium compound mixture of Example 1 were combined with 0.25 g. of tributyl tin oxide and 1.0 g. of the modified cellulose polymer of Example 5 together with 0.2 g. of dimethyl polysiloxane. These ingredients were then diluted with 93.75 g. of water and thoroughly mixed to uniformly disperse the biocide and defoaming constituents. The resultant fluid composition had a viscosity of approximately 650 cps. at room temperature and after a period of over three months was observed to still be in a stable (unseparated) condition.

EXAMPLE 18

Seventy-four grams of the aqueous quaternary ammonium compound mixture of Example 1 were mixed with 5.0 g. of tributyl tin oxide and 15.0 g. of a methyl ether propylene glycol ether cellulose polymer having viscosity producing characteristics such that when this material is present in an aqueous solution in a concentration of 2% by weight it produces a viscosity for such solution of 50 cps. at room temperature. Six grams of dimethyl polysiloxane were then added thereto. The resultant composition was then thoroughly mixed and observed to have an over-all paste-like consistency which, after a period of over three months, was observed to still be in a stable (unseparated) condition.

EXAMPLE 19

This example illustrates a suitable dry mix formulation made in accordance with the present invention which can be subsequently diluted with a suitable liquid such as water or alcohol by the ultimate user. This mixture can be prepared by combining 70 g. of lauryl pyridinium chloride with 10 g. of a polysiloxane fluid and 20 g. of a dry modified cellulose polymer (identical to that described in Example 12). Upon diluting this dry mixture, it was observed that the resultant water treating composition exhibited effective biocidal properties without producing foam in quantities which would be objectionable in air washer systems and similar industrial water installations.

EXAMPLE 20

The specific water treating composition described in Example 3 was field tested in an air washer system. In this particular installation it was known that unless effective water treatment was provided slime would build up in the air washer system resulting in objectionable odors, clogging of the nozzles, and an over-all unsightly appearance.

Conventional quaternary ammonium compounds had been used to treat this water. On a continuous basis, quaternary ammonium compound concentrations in the water of from 1 to 5 p.p.m. were found to be satisfactory for slime control. It was similarly observed that large single doses of quaternary ammonium compound could be periodically used to provide a satisfactory slime control technique, such doses generally being sufficient to provide the water with a concentration of approximately 200 p.p.m. of the particular quaternary ammonium compound. It was found, however, that in treating the water with the quaternary ammonium compound in this manner, that objectional amounts of foam develop resulting in air entrainment of the quaternary ammonium compounds. Also, various contaminants in the water were scattered throughout the surrounding area.

A polysiloxane defoamer was separately added to the water being treated with the conventional quaternary ammonium compounds. This resulted in satisfactory foam control, however, it required routine inspection in order to insure that the proper defoamer to quaternary ammonium compound ratio was maintained.

The composition identified in Example 3 was then substituted for the previously employed quaternary ammonium compound and the chemical defoamer. It was observed that this composition provided equally effective biological growth control without attendant foaming problems and without requiring the handling and administration of two separate water treating compositions.

EXAMPLE 21

Ten grams of the aqueous quaternary ammonium compound mixture of Example 1 were mixed with 7.2 g. of N-coco-1,3-propylene diamine and 2.0 g. of the modified cellulose polymer of Example 12. Four grams of dimethyl polysiloxane were then added to this mixture together with 5 g. of a 56% aqueous solution of acetic acid and 7.1 g. of water. These ingredients were thoroughly mixed and found to provide a stable water treating composition in accordance with the principles of the present invention which provided effective biocidal control in an industrial water treating system without producing foam therein in objectionable amounts.

EXAMPLE 22

One gram of the modified cellulose polymer of Example 16 was thoroughly mixed with 14.4 g. of N-coco-1,3 propylene diamine and 1.2 g. of dimethyl polysiloxane. These ingredients were then combined with 8.0 g. of a 56% aqueous solution of acetic acid, 1.0 g. of benzotriazole and 74.4 g. of water with thorough mixing to provide an effective control-foaming diamine type water treating composition exhibiting a substantially reduced tendency to produce foam and which, in accordance with the present invention, remained stable (unseparated) for an extended period of time.

EXAMPLE 23

The following example illustrates the substantially improved results obtained with water treating compositions made in accordance with the preferred embodiments of the present invention wherein the defoamer constituent is essentially composed of dimethyl polysiloxane and tris (2-ethylhexyl) phosphate. Four separate samples were tested. The first sample did not include a defoamer constituent, the second sample contained a defoamer constituent composed of dimethyl polysiloxane only, the third sample contained a defoamer constituent composed of tris (2-ethylhexyl) phosphate only and the fourth sample contained a defoamer constituent composed of dimethyl polysiloxane and tris (2-ethylhexyl) phosphate in the same amounts as were contained in samples II and III, respectively. As the data below show, a synergistic defoaming action is obtained where the dimethyl polysiloxane and tris (2-ethylhexyl) phosphate are combined.

Sample I

An emulsion type water treating composition containing the following materials was first prepared.

| | Percent |
|---|---|
| Modified cellulose polymer of Example 16 | 1.5 |
| N-coco-1,3 propylene diamine | 7.2 |
| Acetic acid | 8.0 |
| Aqueous quaternary ammonium compound biocide mixture of Example 1 | 10.0 |
| Water | 73.3 |

150 mg. of this sample were added to 500 cc. of Chicago tap water and the mixture then vigorously agitated for 30 seconds. The sample was then set aside. A large amount of foam was produced immediately and it was observed that after a period of 24 hours small amounts of this foam still remained on the surface of the sample.

Sample II

An emulsion type water treating composition containing the following materials was first prepared.

| | Percent |
|---|---|
| Modified cellulose polymer of Example 16 | 1.5 |
| N-coco-1,3 propylene diamine | 7.2 |
| Acetic acid | 8.0 |
| Aqueous quaternary ammonium compound biocide mixture of Example 1 | 10.0 |
| Dimethyl polysiloxane emulsion (30% active) | 1.0 |
| Water | 72.3 |

150 mg. of this sample were added to 500 cc. of Chicago tap water and the mixture then vigorously agitated for 30 seconds. The sample was then set aside. A relatively large amount of foam was initially produced. After 120 minutes all of this foam had disappeared.

Sample III

An emulsion type water treating composition containing the following materials was first prepared.

| | Percent |
|---|---|
| Modified cellulose polymer of Example 16 | 1.5 |
| N-coco-1,3 propylene diamine | 7.2 |
| Acetic acid | 8.0 |
| Aqueous quaternary ammonium compound biocide mixture of Example 1 | 10.0 |
| Tris (2-ethylhexyl) phosphate | 6.0 |
| Water | 67.3 |

150 mg. of this sample were added to 500 cc. of Chicago tap water and the mixture then vigorously agitated for 30 seconds. The sample was then set aside. Some foam was initially produced and after a period of 65 seconds all of this foam had completely disappeared.

Sample IV

An emulsion type water treating composition containing the following materials was first prepared.

| | Percent |
|---|---|
| Modified cellulose polymer of Example 16 | 1.5 |
| N-coco-1,3 propylene diamine | 7.2 |
| Acetic acid | 8.0 |
| Aqueous quaternary ammonium compound biocide mixture of Example 1 | 10.0 |
| Dimethyl polysiloxane emulsion (30% active) | 1.0 |
| Tris (2-ethylhexyl) phosphate | 6.0 |
| Water | 66.3 |

150 mg. of this sample were added to 500 cc. of Chicago tap water and the mixture then vigorously agitated for 30 seconds. The sample was then set aside. Some foam was initially produced, however, all of this foam had completely disappeared after 55 seconds.

In summarizing the above data, it is shown that in the samples tested it took approximately two hours to achieve defoaming with the dimethyl polysiloxane defoamer alone, 65 seconds to achieve defoaming with the tris (2-ethylhexyl) phosphate alone, and only 55 seconds to achieve defoaming with the dimethyl polysiloxane and tris (2-ethylhexyl) phosphate. Thus, the defoaming time achieved with the combination of defoamers is approximately 15% less than with the tris (2-ethylhexyl) phosphate alone and substantially less than with the dimethyl polysiloxane alone.

EXAMPLE 24

This example further illustrates the synergistic defoaming action achieved with the preferred embodiment of the present invention. The procedure described in Example 23 was repeated with additional water treating compositions each of which contained 1.5% of the modified cellulose polymer of Example 16, 7.2% of N-coco-1,3 propylene diamine, 8.0% acetic acid, 10.0% of the aqueous quaternary ammonium compound mixture of Example 1, defoaming constituents as more fully set out below in Table I and with the balance of the water treating composition being water.

TABLE I

| Sample | Defoamer constituent | Foam duration |
|---|---|---|
| A | (No defoamer) | 24+ hours. |
| B | 1% dimethyl polysiloxane* | 120 minutes. |
| C | 1% dimethyl polysiloxane*+6% tributyl phosphate. | 139 minutes. |
| D | 1% dimethylpolysiloxane*+6% tri(butoxyethyl) phosphate. | 125 minutes. |
| E | 1% dimethyl polysiloxane*+6% octyl alcohol. | 119 minutes. |
| F | 1% dimethyl polysiloxane*+6% kerosene | 72 minutes. |
| G | 1% dimethyl polysiloxane*+6% tris (2-ethylhexyl) phosphate. | 55 seconds. |
| H | 1% dimethylpolysiloxane*+6% tridecyl alcohol. | 5 seconds. |

*30% active silicone and water emulsion.

As the above data show, the defoaming action achieved with defoamer constituents composed of a polysiloxane and second defoamer selected from the group consisting of tris (2-ethylhexyl) phosphate and tridecyl alcohol is vastly superior to that achieved with other chemical defoamers. It is particularly significant to note that some chemical defoamers such as tributyl phosphate and tri (butoxyethyl) phosphate when used in combination with the dimethyl polysiloxane resulted in a longer foam duration than where the defoamer constituent consisted of only dimethyl polysiloxane.

EXAMPLE 25

The following example illustrates comparative defoaming results obtained with identical water treating compositions except for variations in the respective amounts of tris (2-ethylhexyl) phosphate and dimethyl polysiloxane. Sample IV was identical to sample IV of Example 23 having a defoamer constituent composed of 6% tris (2-ethylhexyl) phosphate and 1% of the 30% active dimethyl polysiloxane emulsion. Sample V was identical to sample IV except that the defoamer constituent was composed of 4% tris (2-ethylhexyl) phosphate and 3% of the 30% active dimethyl polysiloxane emulsion. Sample V was identical to sample IV except that the defoamer constituent was composed of 1% tris (2-ethylhexyl) phosphate and 6% of the 30% active dimethyl polysiloxane emulsion.

150 p.p.m. concentrations of these water treating compositions were added to 500 ml. samples of Chicago tap water. These mixtures were then vigorously agitated for 30 seconds, set aside and the time required for all foam to disappear recorded. After 20 hours these samples were again vigorously agitated for 30 seconds, set aside and the time required for all foam produced during the second agitation to disappear recorded. The results are as follows:

TABLE II

| Water treating composition | Defoaming time in seconds for fresh solution | Defoaming time in seconds for 20 hours hours old solution |
|---|---|---|
| Sample IV | 55 | 45 |
| Sample V | 37 | 52 |
| Sample VI | 45 | 72 |

As the above data show, increasing the concentration of tris (2-ethylhexyl) phosphate in the defoamer constituent produced improved durability of defoaming action.

In the foregoing specification, many specific embodiments and details as to specific compositions have been set forth. It will, however, be apparent to those skilled in the art that certain of the details thereof may be varied without departing from the spirit and scope of the present invention. Accordingly, this invention is to be only limited in scope by the appended claims.

I claim:

1. An improved water treating composition consisting essentially of from approximately 1% to 75% by weight of a biocide constituent which includes a biocide selected from the group consisting essentially of quaternary ammonium compounds and organic amines which are characterized by effective biocidal properties and exhibit a tendency to produce foam in industrial water systems; a defoamer constituent which consists essentially of a polysiloxane defoamer, said defoamer constituent being present in said composition in an amount which ranges from about 1 part of said defoamer constituent for each half part of said biocide constituent to about 1 part of said defoamer constituent for each 50 parts of said biocide constituent; and, a modified cellulose polymer which when present in an aqueous solution in a concentration of 2% by weight produces a viscosity for such solution of at least 25 cps. at room temperature, said modified cellulose polymer being present in said composition in an amount sufficient to enable said normally immiscible biocide constituent and defoamer constituent to form an emulsion which remains stable for an extended period of time.

2. The water treating composition of claim 1 wherein said modified cellulose polymer has a molecular weight of from approximately 10,000 to 125,000 and is present in said composition in a concentration of from approximately 0.5% to 25% by weight.

3. The improved water treating composition of claim 1 wherein said modified cellulose polymer is a cellulose ether.

4. The improved water treating composition of claim 3 wherein said cellulose ether is selected from the group consisting of methyl ether cellulose, propylene glycol ether cellulose, hydroxyethyl ether cellulose, hydroxypropyl ether cellulose, and methyl ether propylene glycol ether cellulose.

5. The improved water treating composition of claim 1 wherein said modified cellulose polymer when present in an aqueous solution in a concentration of 2% by weight produces a viscosity for such solution of at least 4,000 cps. at room temperature.

6. The improved water treating composition of claim 1 wherein said biocide constituent, said defoamer constituent, and said modified cellulose polymer are combined with a diluent selected from the group consisting of water and alcohols having from 1 to 4 carbon atoms.

7. The improved water treating composition of claim 6 wherein the amount of said defoamer constituent ranges from approximately 0.5% to 40% by weight, and the amount of said modified cellulose polymer ranges from approximately 0.5% to 25% by weight, said weights being based on the total weight of said composition and said diluents.

8. The improved water treating composition of claim 1 wherein said defoamer constituent which consists essentially of a polysiloxane defoamer and a second defoamer selected from the group consisting of tris (2-ethylhexyl) phosphate and tridecyl alcohol, said polysiloxane defoamer and second defoamer being present in an amount ranging from approximately 1 part of polysiloxane defoamer for each 2 parts of said second defoamer to 1 part of said polysiloxane defoamer for each 200 parts of said second defoamer.

9. The improved water treating composition of claim 8 wherein said modified cellulose polymer is a cellulose ether having a molecular weight of from approximately 10,000 to 125,000.

10. The improved water treating composition of claim 9 wherein said cellulose ether is selected from the group consisting of methyl ether cellulose, propylene glycol ether cellulose, hydroxyethyl ether cellulose, hydroxypropyl ether cellulose, and methyl ether propylene glycol ether cellulose.

11. A body of water in an industrial water system wherein only minimal quantities of foam can be tolerated, said body of water having been treated for control of bacterial and fungal growth therein on a single stream basis with an improved emulsion type water treating composition, said improved emulsion type water treating composition consisting essentially of a biocide constituent which includes a biocide selected from the group consisting of quaternary ammonium compounds and organic amines which are characterized by effective biocidal properties and exhibit a tendency to produce foam in industrial water systems, a defoamer constituent which consists essentially of a polysiloxane defoamer, and a modified cellulose polymer having a molecular weight of from approximately 10,000 to 125,000, said biocide constituent being present in said body of water in a concentration ranging from approximately 0.1 p.p.m. to 200 p.p.m., said defoamer constituent being present in said body of water in a concentration ranging from approximately 0.1 p.p.m. to 400 p.p.m. and said modified cellulose polymer being present in said body of water in a concentration range of from approximately 0.006 p.p.m. to 500 p.p.m.

12. The body of water of claim 11 wherein said defoamer constituent includes a polysiloxane defoamer and a second defoamer selected from the group consisting of tris (2-ethylhexyl) phosphate and tridecyl alcohol.

13. The body of water of claim 12 wherein said modified cellulose polymer is a cellulose ether selected from the group consisting of methyl ether cellulose, propylene glycol ether cellulose, hydroxyethyl ether cellulose, hydroxypropyl ether cellulose, and methyl ether propylene gycol ether cellulose.

References Cited

UNITED STATES PATENTS

| | | | |
|---|---|---|---|
| 2,894,913 | 7/1959 | Sullivan et al. | 252—358 |
| 3,076,768 | 2/1963 | Boylan | 252—358 |
| 3,265,631 | 8/1966 | Jordan | 252—316 |

OTHER REFERENCES

Ross: Chemical Antifoaming Agents, Chemical Industries, May 1949, pp. 757–759.

Methocel Publication, Dow Chem., May 1, 1958, p. 3.

LEON D. ROSDOL, Primary Examiner

W. E. SCHULZ, Assistant Examiner

U.S. Cl. X.R.

210—64; 252—321, 358

UNITED STATES PATENT OFFICE
CERTIFICATE OF CORRECTION

Patent No. 3,510,433          Dated  May 5, 1970

Inventor(s)   Anthony F. Pasowicz

It is certified that error appears in the above-identified patent and that said Letters Patent are hereby corrected as shown below:

Column 3, line 2, after "with" insert --this--

Column 5, line 31, the number "2,646,231" should read --2,464,231--

Signed and sealed this 23rd day of March 1971.

(SEAL)
Attest:

EDWARD M. FLETCHER, JR.
Attesting Officer

WILLIAM E. SCHUYLER, JR.
Commissioner of Patents